COUNTER FAILURE DETECTOR

Filed Dec. 5, 1957 5 Sheets-Sheet 1

INVENTOR.
AUGUST P. ARNETH JR.
BY
Joseph J. Connerton
ATTORNEY

Oct. 16, 1962 A. P. ARNETH, JR 3,058,655

COUNTER FAILURE DETECTOR

Filed Dec. 5, 1957 5 Sheets-Sheet 4

United States Patent Office 3,058,655
Patented Oct. 16, 1962

3,058,655

COUNTER FAILURE DETECTOR

August P. Arneth, Jr., Wappingers Falls, N.Y., assignor to International Business Machines Corporation, New York, N.Y., a corporation of New York Filed Dec. 5, 1957, Ser. No. 700,856
17 Claims. (Cl. 235—153)

The present invention relates to an error detection circuit and more particularly to a device for detecting the catastrophic or intermittent failure of a binary flip-flop counter circuit.

In counters associated with digital computing apparatus, it is essential in order to derive an accurate solution that any errors occurring during a counting operation be detected upon occurrence. To accomplish this objective and thereby prevent erroneous computation, it is desirable to have error detection devices which sense the failure of any counter component as it occurs. One method of detecting errors employed in the prior art is to employ an additional bit or bits known as parity or redundancy bits to indicate whether the number of predetermined symbols represented in binary form is odd or even. Such a system is described in copending application Serial No. 541,245, "Code Generator," now U.S. Patent No. 2,884,625, filed by B. W. Kippenhan on October 18, 1955. In a conventional flip-flop counter using carry gate circuits between counter stages, the failure of the counter to respond to an input pulse may not be detected, since a parity checking circuit has no provision for the detection of component failures and is further limited to detecting only single errors or some odd multiple thereof.

The present invention is directed to circuits for detecting the catastrophic or intermittent failures of counter components, in particular binary or quasi-binary counters, the embodiments varying in complexity in accordance with the degree of protection desired. As herein employed, the term "catastrophic" failure refers to the complete failure of the counter component as contrasted with intermittent failures of counter components which may occur at random intervals. The various arrangements herein described utilize the principle that each input pulse applied to a counter causes one stage of the counter to be set in the "1" state and all lower orders of the counter to the "0" state. One embodiment for checking the catastrophic failure of the component flip-flops combines the "1" output of each stage and the "0" output of the immediate lower stage through logical "AND" circuits, and an output from any of the AND circuits is interpreted as an indication of the absence of error. Another arrangement for checking the catastrophic failure of counter flip-flops and carry gate circuits in the "Off" condition combines the differentiated "1" and "0" outputs of adjacent counter stages in the above described manner whereby an output from any of the AND circuits indicates the simultaneous transition of the higher order stage to "1" and the immediate lower order stage to "0." Carry gate failures in the "On" conditions are checked in this arrangement by conditioning an associated gate circuit with the "0" output of each flip-flop and sampling this gate with the "1" output from the carry gate circuit of the same order. A more elaborate arrangement of the present invention detects random or intermittent errors in addition to errors resulting from catastrophic failure of counter components by checking that one and only one stage of the counter is set to the "1" state and that all lower orders are set to the "0" state. All arrangements include an alarm system which is automatically actuated by any detected errors in the counter on the succeeding count pulse.

Accordingly, a primary object of the present invention is to provide an improved counter checking device.

Another object of the present invention is to provide an improved flip-flop counter checking circuit.

A further object of the present invention is to provide an improved counter checking circuit for detecting the catastrophic failure of the component flip-flops and carry gate circuits.

Another object of the present invention is to provide an automatic counter checking circuit for detecting random intermittent errors introduced into the counter.

Another object of the present invention is to provide an improved error detection circuit for automatically detecting errors introduced into the counter circuit by catastrophic or intermittent failure of the component flip-flop or carry gate circuits.

Other objects of the invention will be pointed out in the following description and claims and illustrated in the accompanying drawings, which disclose, by way of example, the principle of the invention and the best mode, which has been contemplated, of applying that principle.

Figure 1:
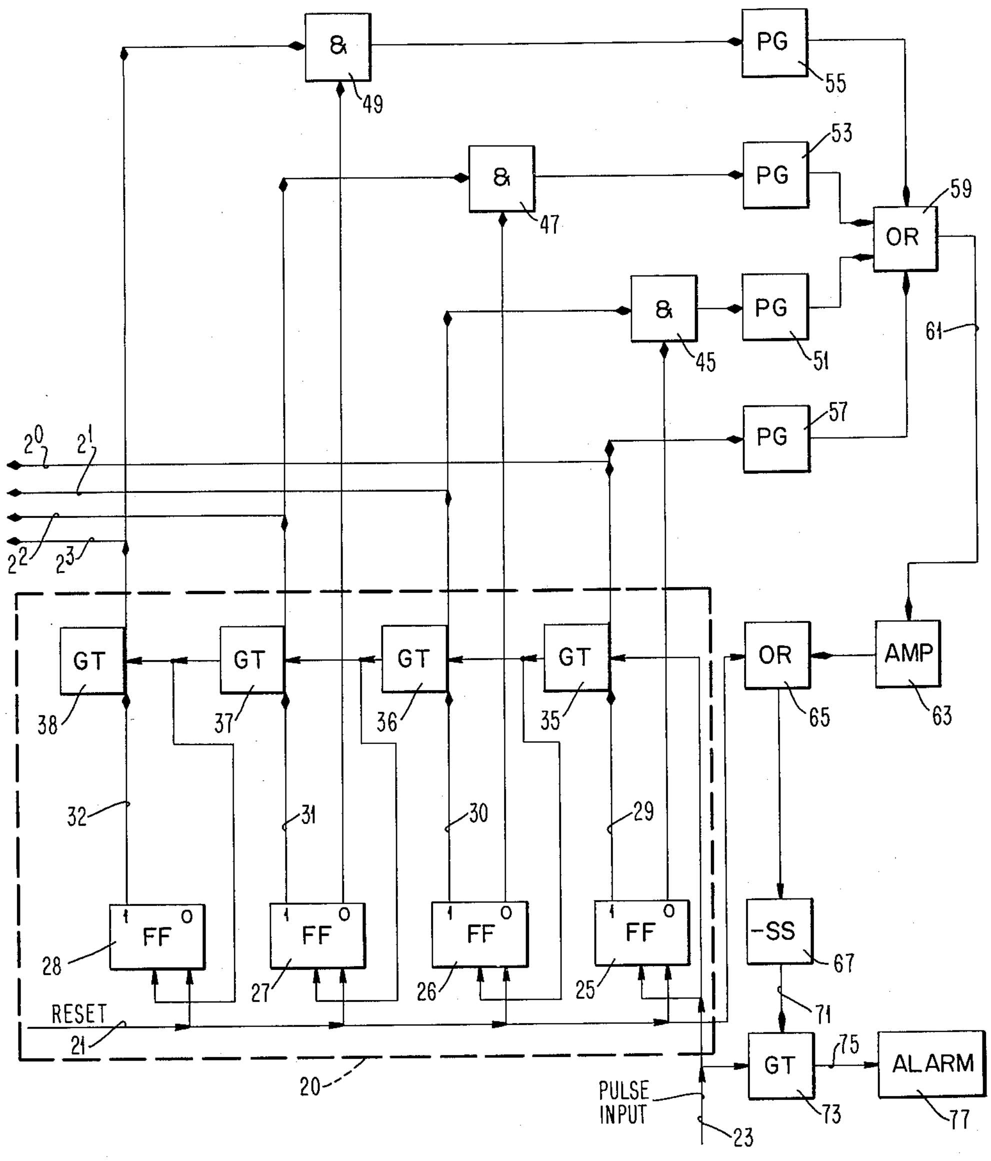
FIG. 1 illustrates in simplified block form a preferred embodiment of the subject invention for detecting catastrophic failure of the counter flip-flops.

Throughout the following description and in the accompanying drawings there are certain conventions employed which are familiar to certain of those skilled in the art. Additional information concerning those conventions is as follows:

In the logical or block diagrams of the drawing, a conventional filled-in arrowhead is employed throughout the drawing to indicate (1) a circuit connection, (2) energization with positive pulses and (3) the direction of pulse travel which is also the direction of control. A diamond-shaped arrowhead indicates (1) a circuit connection and (2) energization with a D.C. level. The D.C. levels employed in the present apparatus, except where otherwise indicated, are on the order of 10 volts when positive and 30 volts when negative. The input and output lines of the block symbols are connected to the most convenient side of the block for ease of illustration. A line entering a corner of a block symbol and emerging from the adjacent corner of that block symbol indicates that the pulses or D.C. levels are applied to the input of the circuit represented by the block and are simultaneously applied to additional circuits indicated by the line extension. Flip-flops in the "1" and "0" states are described as "set" and "reset." A positive signal applied to the "0" input is said to "reset" the flip-flop, while a positive signal applied to the complement input reverses the existing state of the flip-flop. The "1" state of the flip-flop indicates that the outputs labeled 1 and 0 are at a binary "1" and "0" levels respectively. The "0" state indicates that the potential of the outputs labeled 1 and 0 are reversed. In the preferred embodiment, binary 1 is positive with respect to binary 0. The term positive as applied to flip-flop transition designates a transition from the "0" to the "1" state, while the term negative designates a transition from the "1" to the "0" state. Logical circuits will be hereinafter designated as AND or OR circuits.

In the description the general arrangement of preferred embodiments of this invention will be described with respect to the manner in which the various circuit components and apparatus are interconnected as well as the general over-all operation which is performed by these components and apparatus. The description of the general arrangement will be followed by separate and detailed descriptions of the various components and apparatus which so require it.

Referring now to the drawings and more particularly to FIG. 1 thereof, there is illustrated in block form a logical arrangement of a counter failure detector. A counter enclosed in the dotted block 20 comprises flip-flops 25 through 28 and associated carry gates 35 through 38, wherein flip-flop 25 represents the $2^0$ order, flip-flop 26 the $2^1$ order, flip-flop 27 the $2^2$ order and flip-flop 28 the $2^3$ order. While a four stage counter is herein described as illustrative of the principle of the present invention, the invention is equally applicable to counters having a greater or lesser number of stages. Each of the flip-flops 25–28 is a bistable device wherein one of its stable states is referred to as the "1" state and the other as the "0" state. These flip-flops may be any suitable one of several well known types, but preferably they are the Model C flip-flop shown and described in copending application Serial No. 494,982, now U.S. Patent 2,988,735, entitled "Magnetic Data Storage," filed by R. R. Everett et al. on March 17, 1955. Gate circuits 35 through 38 are conditioned by the "1" output of flip-flops 25 through 28 and pass the input pulse to complement the appropriate order flip-flop; and together with these flip-flops function as a counter to establish a count of pulses applied to line 23 labeled "Pulse Input." The outputs of the four stage counter are illustrated by conductors labeled $2^0$ through $2^3$ respectively. Before describing the error detecting circuitry, the operation of the counter will be briefly described. Prior to operation, a pulse is applied to conductor 21 labeled "Reset" to turn all the flip-flops to the "0" state. When the first input pulse from conductor 23 labeled "Pulse Input" is applied to the complement input of flip-flop 25, flip-flop 25 is set to the "1" state, thereby conditioning gate circuit 35 through conductor 29. The input pulse is also applied directly to gate circuit 35. However, since gate circuit 35 is conditioned after pulse applied from conductor 23 has terminated, no output is provided. On the next input pulse applied to conductor 23, flip-flop 25 is reset to the "0" state thereby deconditioning gate circuit 35. Simultaneously, the pulse is gated through gate circuit 35 to the complement input of flip-flop 26, thereby setting flip-flop 26 to the "1" state and conditioning gate circuit 36 through conductor 30. On the next succeeding input pulse, flip-flop 25 is turned on, thereby conditioning gate tube 35 as heretofore described, while flip-flop 26 remains in the "1" state and gate circuit 36 remains conditioned. On the fourth input pulse, flip-flop 25 is complemented to "0" directly, flip-flop 26 is reset to "0" through gate circuit 35 and the input pulse is gated through gate circuit 36 to the complement input of flip-flop 27, thereby setting flip-flops 27 and conditioning gate circuit 37. Thus after four input pulses, flip-flop 27 is "set," flip-flops 25 and 26 are "reset." In the same manner, the count is propagated through flip-flops 25–28 and their associated gate circuits for a maximum count of 15, at which time flip-flops 25 through 28 are set in the "1" state.

From the above described operation of the counter, it will be apparent that each input pulse causes one and only one flip-flop to be set to the "1" state and the succeeding lower order flip-flop to be reset to the "0" state. The condition where only the first stage of the counter is set to the "1" state is checked directly. By combining the "1" output of the three higher order flip-flops 26–28 with the "0" output of the three lower order flip-flops 25–27 respectively in the manner described hereinafter, the catastrophic failure of any flip-flop will be detected when next it is used. In the preferred embodiment of FIGURE 1 herein described, the "1" output of flip-flops 26, 27 and 28 are combined with the "0" output of flip-flops 25, 26 and 27 through AND circuits 45, 47 and 49 respectively. The output of these AND circuits will be positive only when both the higher order flip-flop is in the "1" state and the next lower order flip-flop is in the "0" state. The output of AND circuits 45, 47 and 49 are differentiated through pulse generators 51, 53 and 55 respectively, while the "1" output of the lowest order flip-flop 25 is applied directly through conductor 29 to pulse generator 57. By combining the outputs in the four stages in the above described manner, for each input pulse there should be an output from one pulse generator. Combining the pulse generator outputs through OR circuit 59 will provide an output signal on conductor 61 for each count pulse applied to the counter.

If a malfunction occurs whereby the selected one of the flip-flops 26–28 remains in the "0" state, the AND circuit for which this is the higher order flip-flop will not produce a positive output, since this would be the flip-flop normally set to the "1" state, and there will, therefore, be no output signal on conductor 61. If flip-flop 25, for example, remains in the "0" state, there will be no input applied to pulse generator 57 and thus no output will be produced on output conductor 61. Thus if any flip-flops 25–27 fail in the "0" state, the counter pulse will not be propagated and there will be no differentiated pulse on output conductor 61. If flip-flop 28 fails in the "0" state, there will be no input applied to AND circuit 49 and thus no output on conductor 61.

The manner in which the absence of an output from OR circuit 59 actuates the alarm device 77 will now be described. The output signal on conductor 61 after being suitably amplified by amplifier circuit 63 is applied through OR circuit 65 to negative single shot multivibrator 67. The output from single shot 67 is positive in its quiescent state and therefore normally conditions gate circuit 73, but in response to a signal from OR circuit 65 generates a negative signal on conductor 71 to decondition gate circuit 73 for an interval slightly longer than one but less than two pulse periods. It will be noted from the drawing that each input pulse on conductor 23 samples alarm gate 73, and if no errors have been detected and the gate circuit is deconditioned by the previous pulse, the gate is "off." However, when an error is detected as above described, the absence of an output on conductor 61 conditions alarm gate 73 and the succeeding pulse triggers alarm device 77. Preliminary to each counting operation, the counter reset pulse on conductor 21 comprising the other input to OR circuit 65 triggers single shot 67 to prevent an alarm being generated by the first count pulse.

An additional check on the operation of the flip-flops, not herein illustrated, consists in determining that the Reset pulse actually resets all flip-flops to the "0" state. This check may be provided by combining the "0" output of all the flip-flops through an AND circuit and sensing the output of the AND circuit immediately after Reset time. Failure of any of the flip-flops to reset to the "0" state would be immediately indicated by the absence of an output from the AND circuit. Such a check may be provided by connecting the counter output conductors labeled $2^0$ through $2^3$ through a logical AND circuit, the output of the AND circuit indicating whether all counter flip-flops have actually reset.

While the above described arrangement of FIG. 1 will detect certain catastrophic failures of flip-flops, it is quite vulnerable to carry gate failures. If carry gate 36, for example, fails "off" i.e., does not pass any pulses, after having set flip-flop 27, the next time the flip-flop 26 is in the "1" state and a pulse is received, flip-flop 26 will reset but neither flip-flops 27 nor 28 will receive a carry pulse. The differentiated pulse which would normally be provided by combining the "1" output of flip-flop 28 and the "0" output of flip-flop 27 will not be generated, but since the flip-flop 27 is already set in the "1" state, the resetting of flip-flop 26 to the "0" state will energize AND circuit 47, the output of which will inhibit the alarm circuit in the manner heretofore described, thereby permitting the error to pass undetected.

If however gate 36 fails "on," i.e., passes everything, flip-flops 26 and 27 will lock together and for each output from carry gate 35, there will be a simultaneous transition of the two adjacent flip-flops to the "1" state. If gate circuit 35 operates properly once within a count and then fails "down," flip-flops 26 and 27 will operate together but will be out of step by 180°. Under both of these conditions, an output pulse will be generated and the error will pass undetected by the above described arrangement.

Figure 2:
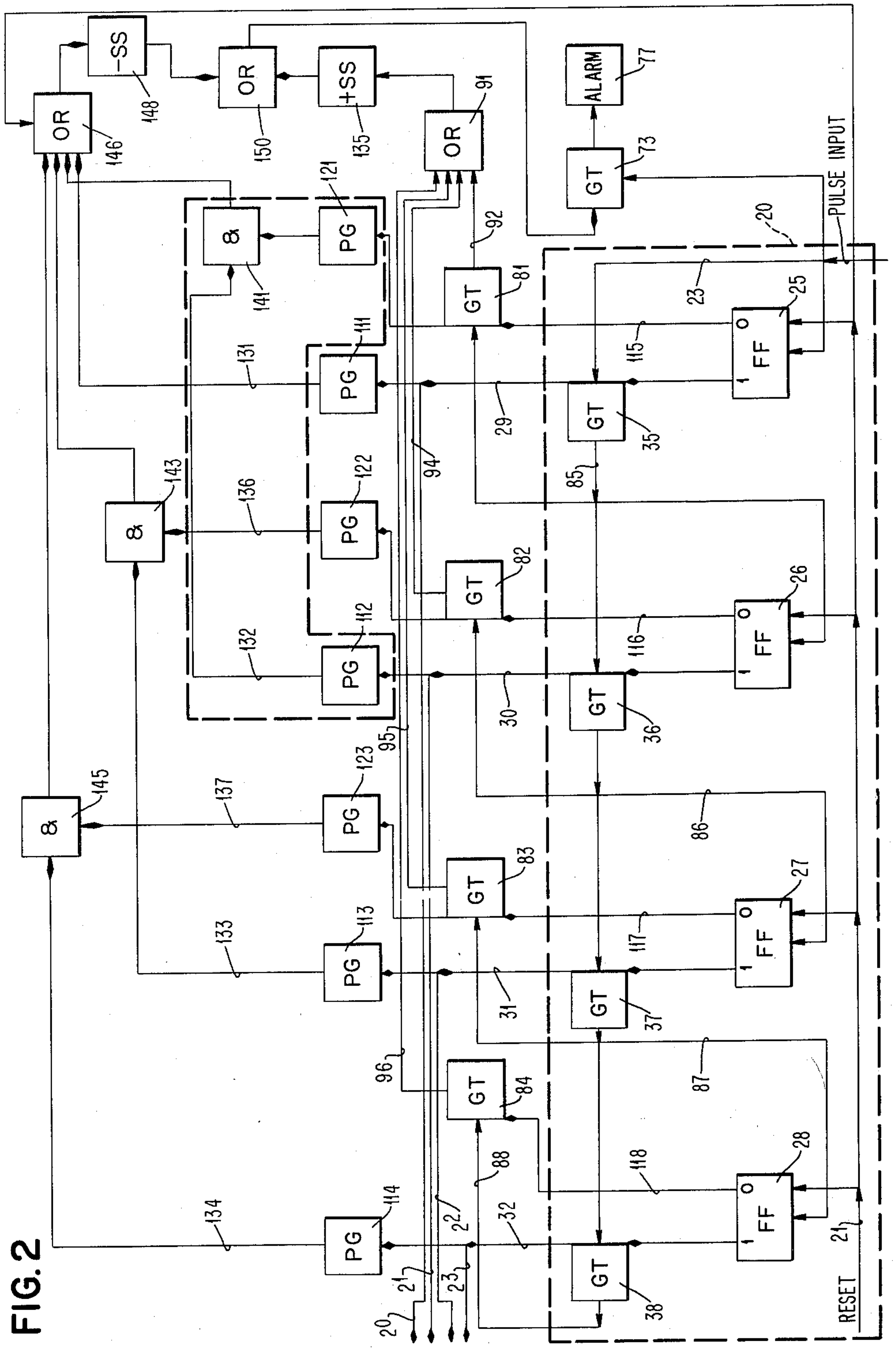
FIG. 2 illustrates in simplified block form a preferred embodiment of the present invention for detecting the catastrophic failure of the counter flip-flops and carry gates circuits.

To overcome these limitations and provide for detection of carry gate failures as well as flip-flop failures, the arrangement shown in FIG. 2 is employed. Basically, protection against "off" gate failures is accomplished by reversing the differential or pulse generator and logical AND stages with respect to the FIG. 1 embodiment such that a simultaneous transition of one order to the "1" state and the adjacent lower order to the "0" state is required to obtain an output from the appropriate AND circuit. Protection against "on" gate failures is provided both for flip-flops locked in step and out of step. Gate circuits 81–84, conditioned by the "0" output of flip-flops 25–28, are sampled by conductors 85–88 from carry gate circuits 35–38 respectively. This arrangement serves a dual function in detecting either "on" carry gate failures or flip-flop failures wherein both outputs are simultaneously "up" or at the upper output level. Since the flip-flop anodes are connected to the "1" and "0" outputs, the latter situation might arise when the filament of a tube opens, thereby causing both outputs to rise to the maximum output level. The operation of the subject device under both situations for a given stage will be described, but it will be understood that the operation for all stages is identical.

Considering that flip-flop 25 identified as the first counter stage has failed so that both outputs are "up," gate circuits 35 and 81 are conditioned by the respective "1" and "0" outputs of flip-flop 25. When an input pulse is received on conductor 23, it samples gate circuit 35 and the resultant output on conductor 85 samples gate circuit 81, thereby providing a signal through OR circuit 91 and conductor 92 to actuate alarm device 77 in a manner more fully described hereinafter.

Assuming now that the counter flip-flops are operating satisfactorily but that carry gate circuit 36 has failed "on" and flip-flop 26 is reset to the "0" state, the zero output of flip-flop 26 conditions gate circuit 82. When the next input pulse is applied to flip-flop 26 through gate circuit 35, it also passes through gate circuit 36 and conductor 86 to sample gate circuit 82. Since gate circuit 82 is conditioned by the "0" output of flip-flop 26, a signal is applied from gate circuit 82 through conductor 94 to OR circuit 91 to actuate the alarm circuit. Thus gate circuits 81–84 detect either flip-flop failures in which both outputs are "up," or "on" carry gate circuit failures.

While the above described checking has been described with respect to a single counter stage, it is obvious that the same protection is afforded to the remaining stages. The outputs of flip-flops 25–28 are connected through conductor 29–32 to pulse generators 111–114, while the "0" outputs of flip-flops 25–27 are connected through conductors 115–117 to pulse generators 121–123 respectively. Pulse generators 111–114 are differentiating circuits which respond to a positive transition of flip-flops 25–28 to generate a positive spike on conductors 131–134, while pulse generators 121–123 respond to a negative transition of flip-flops 25–27 to generate a positive spike on conductors 135–137 respectively. These outputs are then combined through AND circuits 141, 143 and 145 in the same manner as in AND circuits 45, 47 and 49 in FIG. 1 to detect catastrophic flip-flop failures, and in combination with pulse generators 111–114 and 121–123 function to detect "off" carry gate failures. Since flip-flop 28 represents the highest stage in the preferred counter embodiment, there is no pulse generator required from its "0" output. Flip-flop failure detection, as in FIG. 1, is provided by combining the "1" output of the higher order stages with the "0" output of the next lower order stages. However, this arrangement differs from that of FIG. 1 in that substantially simultaneous transitions of two flip-flops rather than a single transition of one of the associated flip-flop is required to obtain an output from associated AND circuit. Thus AND circuit 141 combines the "1" output of the second stage with the "0" output of the first, AND circuit 143 the "1" output of the third with the "0" output of the second, and AND circuit 145 the "1" output of the fourth with the "0" output of the third.

From the above description it will be evident that by reversing the differentiate and AND stages with respect to the corresponding stages of FIG. 1, a simultaneous transition of one flip-flop to the "1" state and the immediate lower order flip-flop to the "0" state is required to obtain an output from the associated AND circuit. An output from any of AND circuits 141, 143 and 145 will in turn produce an output through OR circuit 146 to actuate negative single shot multivibrator 148, which generates and applies a gate inhibit signal through OR circuit 150 to inhibit alarm gate 73 in the manner heretofore described. Although the error detection circuits of FIGS. 1 and 2 detect catastrophic failures in the flip-flop or carry gate circuits at the time the counter attempts to use the particular logic block, it may not detect a random intermittent error or series of errors.

From the preceding description it may be stated that each input pulse causes one and only one flip-flop to be set to the "1" state and all lower order flip-flops to be reset to the "0" state. However, if a random intermittent error is introduced into the counter, this condition would not hold directly, since the intermittent error could cause a second flip-flop to be set to the "1" state. Using the error detection scheme shown in FIG. 2, the true count would provide the output to inhibit the alarm circuit, and any intermittent errors introduced into the lower order stages would go undetected. To detect such random errors, it is necessary to check that only one counter stage is set to "1" and all lower order stages reset to "0."

Figure 3:
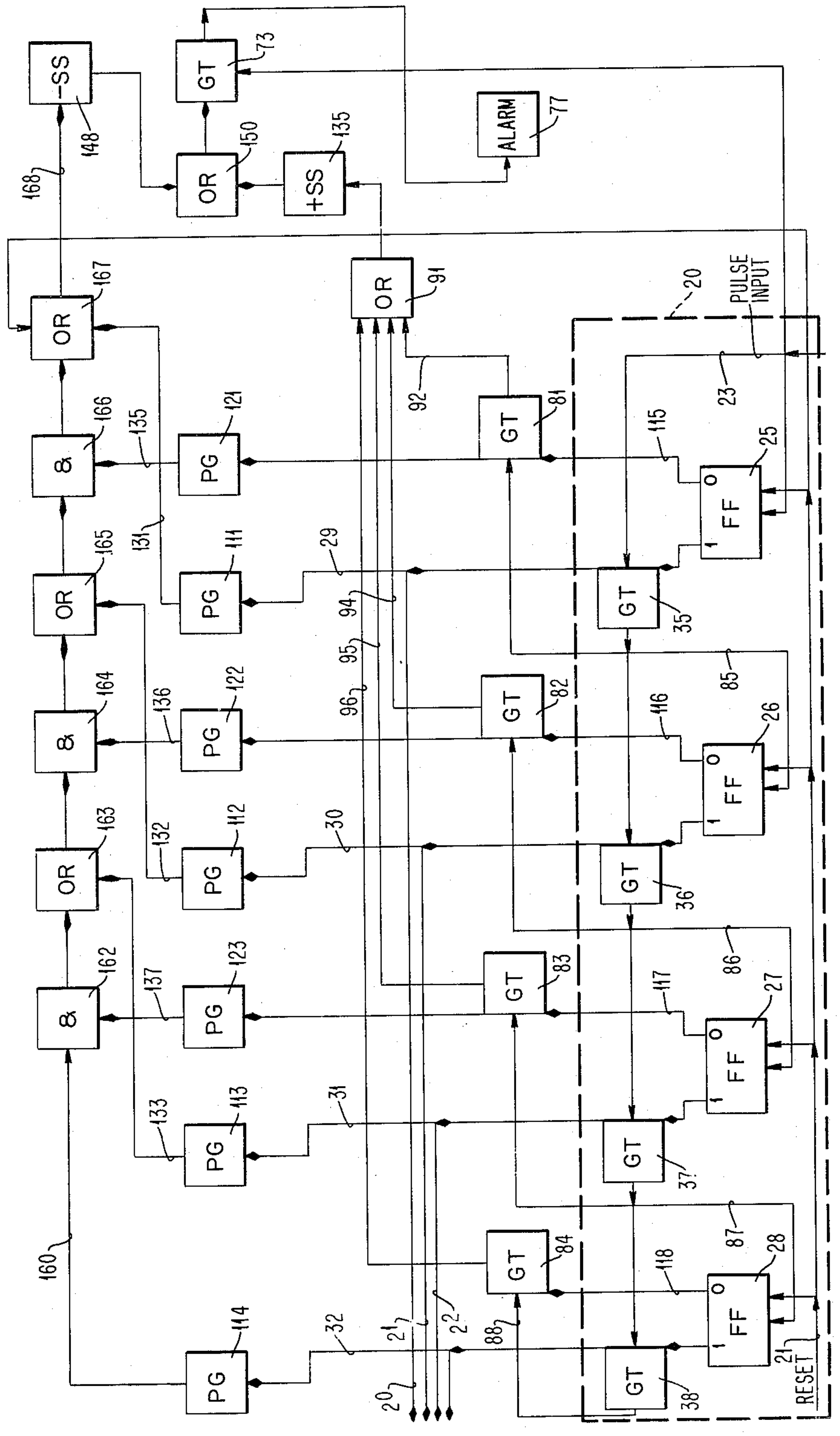
FIG. 3 illustrates in simplified block form a counter checking circuit for detecting catastrophic and intermittent errors in a counter circuit.

Referring now to FIG. 3, there is illustrated in block form an error detecting system for detecting random errors as well as a more efficient method of checking carry gate failures. In the ensuing description, components identical to those in FIG. 2 are identified by similar subscripts. Gate circuits 81 to 84 function in the present arrangement to detect either "on" carry gate failures or detect flip-flop failures wherein both outputs are simultaneously "up" in the manner described with reference to FIG. 2.

The "0" output of flip-flops 25 to 27 are applied to pulse generators 121 through 123 to indicate negative transition of the associated flip-flops by providing differentiated outputs on conductors 135–137; the "1" output of flip-flops 25–28 are connected through conductors 29–32 to pulse generators 111–114 to provide a differentiated output on conductors 131–134 in response to a positive transition of the associated flip-flops. The resultant outputs of pulse generators 121–123 and 111–114 are combined in a cascaded arrangement of logical AND and OR circuits to ensure that one and only one flip-flop is "set" and all lower order flip-flops are "reset."

Assuming for example that a "1" is set in the 4th stage of the counter circuit represented by flip-flop 28, a positive output will be provided from pulse generator 114 through conductor 160 to AND circuit 162, the other input of which comprises the output of pulse generator 123, corresponding to the "0" output from the 3rd counter stage. Assuming that the 4th and 3rd stages of the counter experience substantially simultaneous transition to the "1" and "0" states respectively, an output is provided from AND circuit 162 to OR circuit 163. In like manner, assuming that all lower order stages have been reset to the "0" state, AND circuits 164 and 166 will be conditioned by the "0" outputs from their associated flip-flops. The output from OR circuit 163 is propagated through AND circuit 164, OR circuit 165, AND circuit 166, and OR circuit 167 to provide an output on conductor 168 which actuates single shot multivibrator 148 to inhibit alarm circuit 77 in the manner heretofore described, provided that no output is received from OR circuit 91.

The output of OR circuit 91 actuates single shot 135 which provides a positive output of substantially the same duration as single-shot 148, thereby overriding the inhibiting effect of single-shot 148 and actuating alarm circuit 77 on the next input pulse. If on the other hand a "1" has been erroneously entered into one of the lower stages of the counter, the absence of a "0" output from the stage will prevent the associated "AND" circuit in the cascade arrangement of alternate AND and OR circuits from being conditioned, and the propagation of the signal corresponding to the correct count will be terminated at the AND circuit where the erroneous count has been entered. In the above described example, assume a "1" has been errouneously entered into the second counter stage in addition to the fourth. Since pulse generator 122 is only actuated in response to a transition of the associated flip-flop from the "1" to the "0" state, it will remain de-energized and AND circuit 164 will not be conditioned. The output of pulse generator 114 corresponding to the "1" output from flip-flop 28, will be applied through conductor 160 and propagated through AND circuit 162 and OR circuit 163 to AND circuit 164, where the propagation is terminated. Since no output is provided by OR circuit 167, single-shot 148 remains de-energized, alarm gate circuit 73 remains conditioned until the next input pulse on conductor 23 actuates alarm circuit 77. In the above arrangement, the transition of any flip-flop to the "1" state will result in a signal being applied to a corresponding OR circuit and so long as the lower order stages are reset to "0" this signal will ripple through the logical cascade arrangement to inhibit alarm device 77.

While the above described arrangement of FIG. 3 provides the desired error detection, it requires active elements in logical circuits 162 through 167, since diode logical circuits would require cathode followers between stages in the cascaded arrangement to maintain the signal level.

Figure 4:
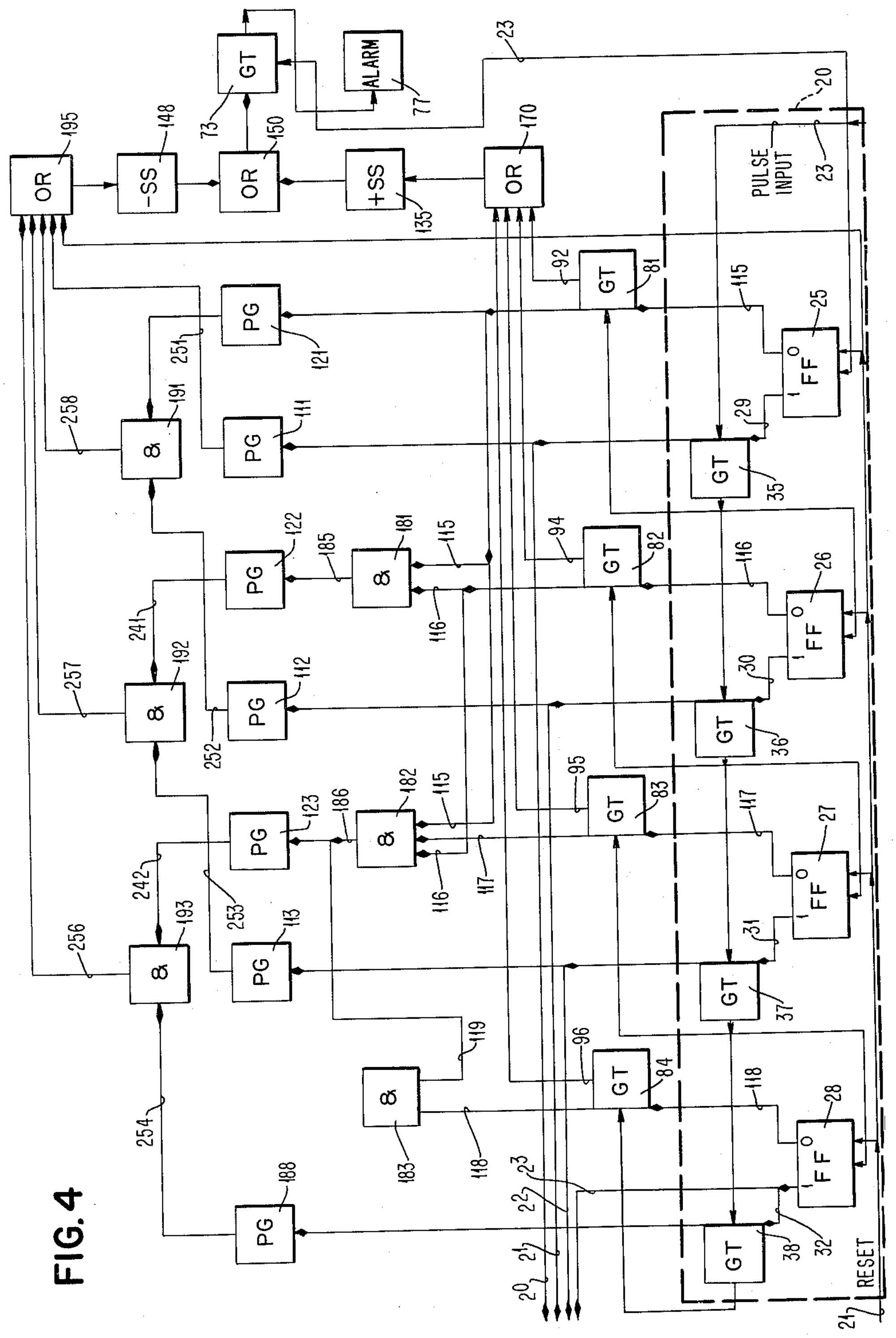
FIG. 4 illustrates in simplified block form another arrangement for detecting catastrophic and intermittent errors in a counter circuit.

An alternate method utilizing the same general principle of error detection but employing passive logical elements for detecting both catastrophic and intermittent failure of the counter is provided by the arrangement in FIG. 4. Since identical components are identified by similar subscripts, the operation heretofore described in FIG. 3 relative to these components will be omitted from the ensuing description. The embodiment in FIG. 4 utilizes the same principle of error detection in checking that one and only one stage has been "set" and all the lower stages "reset." Rather than propagate the count pulse through the Not function, i.e., the "0" state of the lower order flip-flops in the cascaded logic arrangement of FIG. 3, the present embodiment utilizes individual AND circuits to provide the Not indication of the function.

Briefly, the philosophy employed in the embodiment of FIG. 4 is to combine the negative transitions of the counter flip-flops through logical AND circuits, each of these AND circuits having a number of inputs corresponding to the particular order of the counter circuit with which it is associated, prior to differentiating the resultant signals. However, the number of inputs will be limited by design consideration, and arranged in groups whereby the output from one group will comprise one of the inputs to the next. This cascaded arrangement is fully described hereinafter. A single AND circuit is utilized for each counter stage except the lowest and highest. With respect to the arrangement utilized in FIG. 3, the pulse generator and logical AND stages in the FIG. 4 embodiment are effectively reversed. In this manner, the pulse generators associated with the negative flip-flop transitions will not be actuated unless all lower order flip-flops experience a simultaneous transition to the "0" state.

Referring specifically to FIG. 4, AND circuits 181, 182 and 183 have inputs which are associated with the negative transition of the counter stages identified by flip-flops 25, 26, 27 and 28. AND circuit 181 has inputs corresponding to the two lowest order counter stages, AND circuit 182 to the three lowest order stages, and AND circuit 183 to the four stages, each input identifying a negative transition of the associated flip-flop. The output of AND circuit 182, indicative of the "0" output of the three lower stages, comprises one of the inputs to AND circuit 183, while the "0" output of the fourth counter stage applied through conductor 118 constitutes the second input to AND circuit 183. While AND circuit 183 is not required in the present apparatus, it is illustrated to show the manner in which AND circuits must be cascaded when the number of inputs exceeds the capacity of the logical AND circuit. Thus in counters having a number of stages in excess of four, the output from each group would constitute one of the inputs to the lower stage of the next group. This group arrangement is required since the number of inputs to logical AND circuit is limited by the loading effect of the AND circuits on the flip-flops. It should be noted that three inputs represents a high margin circuit and not the maximum number of inputs which can be handled by such AND circuits. Conductors 115 and 116, 115–117 and 118, 119 constitute the respective inputs to AND circuits 181, 182 and 183. A positive signal on any of conductors 115, 116, 117 identifies a negative transition of flip-flops 25, 26 and 27 respectively. Arranging these circuits in the above described manner, and output from AND circuit 181 indicates the simultaneous transition of the two lower stages to zero; an output from AND circuit 182 indicates the simultaneous transition of the three lower stages of the counter to zero.

Assuming that AND circuits 181 and 182 are actuated by the above noted negative transitions, the resultant outputs on conductors 185 and 186 actuate pulse generators 122 and 123, while the negative transition of the lowest order stage on conductor 115 actuates pulse generator 121 directly. These outputs identifying the "0" transition of the associated counter stages are in turn combined with the "1" output of the next higher order stage through AND circuits 191, 192 and 193 in the manner heretofore described. Since only one AND circuit can be actuated for each input pulse, an output from any of AND circuits 191, 192 and 193 will indicate satisfactory operation of the counter. These outputs are then connected through OR circuit 195 to the alarm circuit in the manner heretofore described.

Summarizing the operation of the embodiments of FIGS. 3 and 4, both embodiments detect the catastrophic failure of the counter flip-flops and carry gates and in addition detect random or intermittent errors which may be introduced into the counter. In the FIG. 3 arrangement, the cascade arrangement combines the outputs of the individual stages through associated OR circuits, while in the FIG. 4 arrangement a single OR circuit combines the output of the individual stages.

In FIGS. 1–4, certain basic circuits were illustrated in block form to facilitate the description thereof. These circuits are identified and described in copending application as follows.

Gate circuit, abbreviated GT, and logical AND and OR circuits are illustrated and described in copending application Serial No. 570,199, now U.S. Patent 2,914,248 entitled "Electronic Data Processing Machine" filed by H. D. Ross et al. on March 7, 1956.

The positive single shot multivibrator abbreviated +SS is illustrated and described in copending application Serial No. 414,346, now U.S. Patent 2,954,528, entitled "Monostable Multivibrator" filed by William L. Jackman on December 10, 1954.

Figures 5, 6:
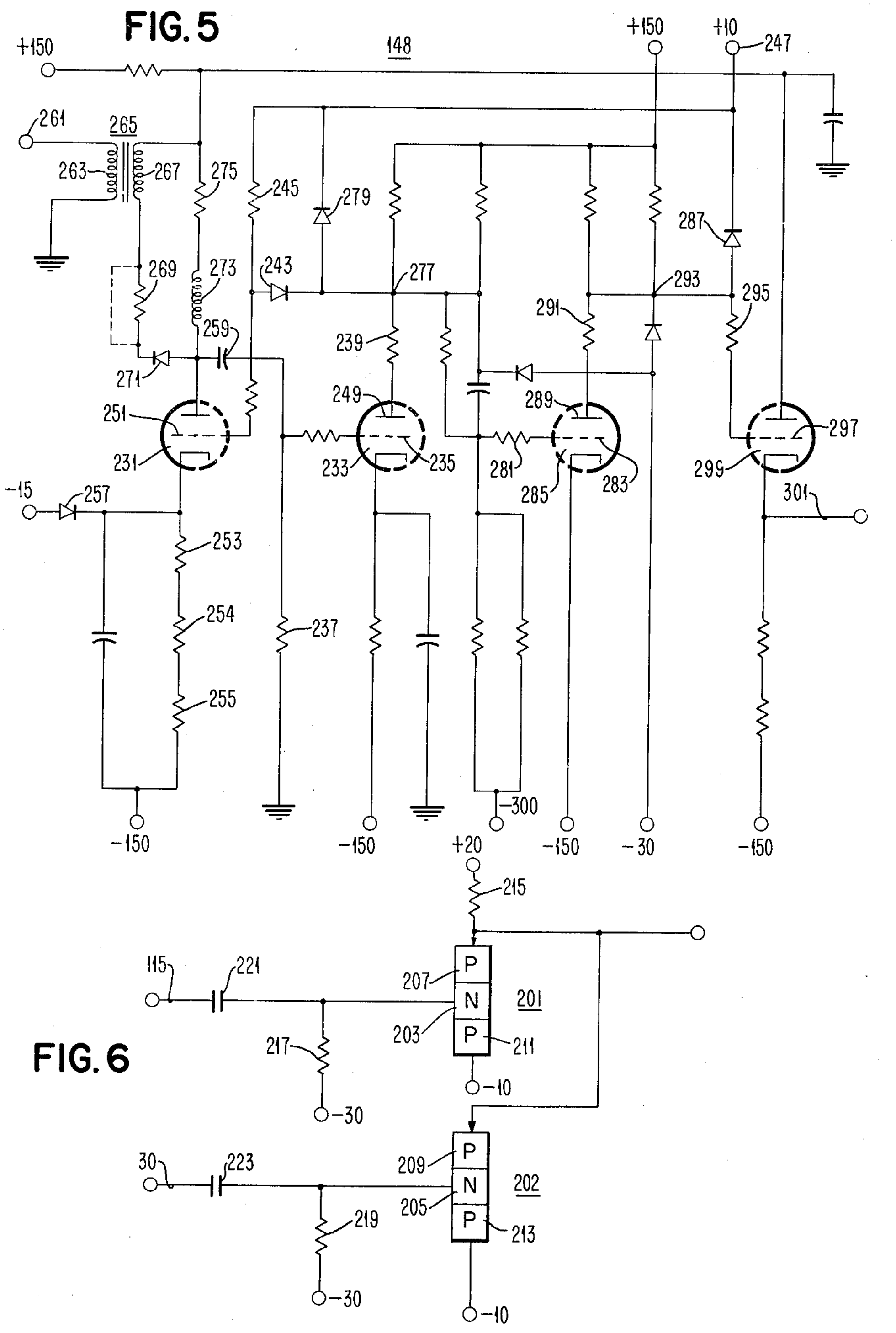
FIG. 5 illustrates in schematic form a negative single shot multivibrator of the type illustrated as block 67 in FIG. 1.
FIG. 6 illustrates in schematic form a transistor logical AND circuit and associated pulse generator inputs identified as blocks 112, 121 and 141 in FIG. 2.

The remaining basic circuits are illustrated in FIGS. 5 and 6 and described hereinafter.

Referring now to FIG. 5, there is illustrated in schematic form a negative single shot multivibrator of the type shown as block 148 in FIG. 2. Essentially, the single shot circuit comprises a positive multivibrator stage, an inverter stage and an output cathode follower stage. Single shot multivibrator 148 produces a negative gate signal of predetermined amplitude and duration. Upon the application of a trigger pulse, the output level drops from its upper value to its lower value to its upper value after the required time interval.

The multivibrator stage of the circuit comprises vacuum tubes 231 and 233 in which the former is normally non-conducting and the latter normally conducting. Control grid 235 of vacuum tube 233 is biased through resistor 237 to approximately −150 volts. The plate current of vacuum tube 233 produces a voltage drop across plate resistor 239. The plate voltage is clamped at −30 volts by diode 241. Since the cathode of diode 243 is at a −30 volts potential set by the plate 249 of vacuum tube 233, current flows through diode 243 and resistor 245 to the +10 volts source 247. Thus, the grid 251 of vacuum tube 231 is normally biased at −30 volts. The cathode potential of tube 231 is set by cathode voltage diode resistors 253, 254 and 255 and clamping diode 257. This sets the cathode voltage at −15 volts, thereby providing a bias of −15 volts to the control grid 251 which is sufficient to maintain tube 231 cut off. This is the static or quiescent state of the multivibrator. The voltage across capacior 259 under these conditions is approximately 300 volts.

To trigger this circuit, a positive pulse is applied to input terminal 261 to the primary winding 263 of transformer 265. Transformer 265 is so wound that no inversion takes place and the resulting positive signal on secondary winding 267 is developed across resistor 269, diode 271, inductor 273 and resistor 275. Diode 271 conducts, causing the anode side of the diode to become instantaneously negative, which in turn causes capacitor 259 to discharge through resistor 237, thereby cutting off tube 233. The plate voltage of tube 233 thereupon rises and the resulting positive swing at terminal 277 is clamped by diode 279 at +10 volts. The cathode of diode 243 has its voltage changed from −30 volts to +10 volts. The anode of diode 243 attempts to change to −30 volts but cannot do so instantaneously because of the interelectrode capacitance of vacuum tube 231. During this time diode 233 is cut off isolating the control grid of vacuum tube 231 and allowing it to rise rapidly to +10 volts. During the positive excursion of grid voltage, vacuum tube 231 conducts thereby causing a drop in plate voltage. Capacitor 259 discharges through resistor 237 to keep vacuum tube 233 cut off. The length of time vacuum tube 233 remains cut off depends on the time constant of resistor 237 and capacitor 259. When capacitor 259 discharges to a point where it can no longer maintain tube 233 cut off, tube 233 resumes conduction to reestablish the quiescent condition for the circuit. As the plate voltage at plate 239 of tube 233 varies between the clamped levels of +10 volts and −30 volts, the signal is applied through resistor 281 to control grid 283 of inverter stage 285. Inverter stage 285 is normally cut off, and its output is normally clamped at +10 volts by diode 287. In response to the positive signal from the multivibrator, tube 285 conducts and produces an output signal from anode 289 through resistor 291 to terminal 293, which is clamped at a potential of −30 volts. The signal is then applied through resistor 295 to control grid 297 of cathode follower stage 299. As the plate voltage of tube 285 drops from its normal level of +10 volts to −30 volts, the cathode of cathode follower 299 varies in a similar manner to produce an output signal on conductor 301 varying between +10 volts and −30 volts for the duration of the multivibrator signal as determined by the time constant of capacitor 239 and resistor 237.

Referring now to FIG. 6, there is illustrated in schematic form a transistor logical AND circuit and a pair of pulse generator inputs of the type shown in logical block form in FIG. 2, for example, AND circuit 141 and pulse generators 121 and 112. Basically, the AND circuit comprises a pair of parallel emitter followers operating in the constant current region in which the current flow must be interrupted in both transistors to obtain an output, while the pulse generators merely comprise RC differentiating circuits at the input to each transistor. PNP transistors 201 and 202 comprise bases 203 and 205, emitters 207 and 209 and collectors 211 and 213. The collectors are connected to a source of −10 volts potential, the emitters are connected through resistor 215 to a source of +20 volts, while the base members are connected through resistors 217 and 219 respectively to a source of −30 volts potential. These transistors are so biased that constant current is normally flowing through both. A positive shift in level at input conductors 115 and 30 resulting from the transition of the associated flip-flops is differentiated by the associated RC differentiating circuits comprising resistors 217, 219 and capacitors 221, 223 to provide positive spikes to base members 203 and 205 of transistors 201 and 202 respectively. In the quiescent state of these transistors, maximum current is flowing so the output is most negative. The positive spike from the RC circuits when applied to both transistors cuts both transistors off and the output goes positive for the duration of the positive spike. If only one input spike is received, for example on conductor 115, transistor 201 will be cut off, but transistor 202 will effectively carry the load of both and due to the low impedance of transistors, there is no appreciable effect on the output.

While the present invention has been described with reference to a counter utilizing carry gates, the principle of the invention is also applicable to a direct transfer flip-flop counter. In such a counter, the "1" output of each stage would be differentiated, the differentiated output applied through an OR circuit to inhibit the alarm circuit in the manner of the embodiment of FIG. 1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit for checking the response of a counter to input signals applied to the counter input comprising a multi-stage counter, each stage of said counter including a bistable device, carry means interconnecting adjacent stages of said counter, means for generating a signal indicative of the transition of state of adjacent counter stages in response to each input signal, an error indicating device and means responsive to said signal indicative of the transistion of state for actuating said error indicating device.

2. An error checking counting circuit comprising a binary counter, each stage of said counter including a bistable device, input means associated with said counter, carry means coupling adjacent stages of said counter, means for generating a signal indicative of the transition of state of at least one of said counter stages, an alarm device and means for selectively actuating said alarm device in response to said signal generating means.

3. An error sensing counting circuit for sensing inaccurate counter operation comprising a multi-stage counter, each stage of said counter including a bistable element, means associated with each of said bistable elements for providing an output signal identifying the state thereof, input means connected to said counter, carry means interconnecting adjacent stages of said counter, an error indicating device, means for generating a signal indicative of the state of adjacent ones of said bistable devices and means for selectively energizing said error indicating device in accordance with said transition indicating signals.

4. An error checking counting circuit comprising in combination a flip-flop counter, input means associated with said counter for applying count pulses thereto, means connected to each flip-flop in said counter for providing output signals identifying the count therein, carry means interconnecting adjacent stages of said counter, means for selectively combining said output signals from adjacent ones of said flip-flops, means for differentiating said output signals, an error indicating device and means responsive to the signals resulting from said combining and differentiating means for selectively actuating said error indicating device.

5. An error checking counting circuit for sensing inaccurate counter operation comprising a counter, said counter including a bistable element for each stage thereof, means associated with each stage of said counter for providing signals indicating the count therein, carry means interconnected between adjacent stages of said counter, a plurality of logical AND circuits for providing signals indicative of the transition of state of adjacent stages of said counter, an alarm device and means for selectively actuating said alarm device in response to said transition indicating signals from one of said plurality of logical AND circuits.

6. A counter failure detector comprising in combination a binary counter, each stage of said counter including a bistable device, the state of at least one of said devices being reversed upon receipt of each input pulse, means associated with each stage of said counter for providing a signal indicative of the state of said bistable device, carry means interconnecting adjacent stages of said counter, a plurality of logical AND circuits for selectively combining said signals from adjacent ones of said bistable devices, a plurality of differentiating circuits associated with said plurality of AND circuits, said logical AND circuits and said differentiating circuits cooperating to provide an output signal in response to predetermined combinations of signals from adjacent counter stages, said output signal indicating the response of said counter to said input pulse.

7. A counter checking circuit comprising in combination a binary counter, said counter including a plurality of flip-flops and gate circuits, one flip-flop for each stage of said counter and a gate circuit interconnected between adjacent stages of said counter, each of said counter stages having first and second output means, means for generating signals indicative of opposite transitions of adjacent one's of said flip-flops in response to each input pulse, said means including a plurality of logical AND circuits connected to said first and second output means and further including pulse generating means actuated by the outputs from said logical AND circuits, an error indicating circuit and means responsive to the outputs of said pulse generating means for selectively actuating said error indicating circuit in response to each of said input pulses.

8. An error checking counting circuit comprising in combination a binary counter having outputs for each stage thereof, each stage of said counter including a bistable device, input means associated with said circuit, means responsive to each input signal for causing transition of at least one of said bistable devices, means for generating a signal for each transition of said bistable devices, an error indicating device and means responsive to selected combinations of said transition indicating signals for selectively actuating said error indicating device.

9. A checking circuit for detecting component failures in a binary counter comprising in combination a binary counter, each stage of said counter including a bistable device, output conductors associated with each stage of said device, input means for applying count pulses to said counter, a plurality of carry gate circuits interconnecting adjacent stages of said counter, means associated with each of said output conductors for generating a first plurality of signals indicative of the transition of the associated bistable devices upon receipt of a count pulse, means responsive to predetermined combinations of said first plurality of signals for generating a signal indicating said count pulse has been counted, means for generating a signal indicative of failure of one of said bistable devices or one of said gate circuits, error indicating apparatus, and means responsive to said signal indicating said count pulse has been counted and the absence of said failure signal for selectively inhibiting said error indicating apparatus.

10. An apparatus of the type claimed in claim 9 wherein said means for generating a signal indicative of a bistable device or gate circuit failure includes a plurality of gate circuits, each of said gate circuits being conditioned by one output from the corresponding bistable device and sampled by the opposite output of said corresponding bistable device through the associated carry gate circuit.

11. An apparatus of the character described in claim 9 wherein said predetermined combinations of said first plurality of signals comprises the binary one output of one stage and the binary zero outputs of all lower order stages.

12. An apparatus of the character described in claim 9 wherein said means responsive to predetermined combinations of said first plurality of signals for generating a pulse indicating said input signal has been counted comprises a cascaded arrangement of logical AND and OR circuits so disposed as to provide an output only upon transition of one stage to the binary one state and all lower order stages to the binary zero state.

13. An error checking circuit for detecting catastrophic or intermittent errors introduced into a counter comprising a binary counter, carry means interconnecting adjacent stages of said counter, means for applying input pulses to said counter, a plurality of output conductors associated with the several stages of said counter, said output conductors providing a first plurality of signals indicative of the count in said counter in response to each input signal, means responsive to said first plurality of signals for generating a second plurality of signals indicative of the transition of said counter stages, means for so combining said second plurality of signals that the transition signal of each stage is selectively combined with the transition signal of the immediately lower stage and means for generating a resultant signal from said combining means indicating said count pulse has been counted, said last named signal functioning to inhibit an error indicating device.

14. An apparatus of the character described in claim 13 wherein said means for combining said second plurality of signals comprises a cascaded arrangement of logical AND and OR circuits interconnected to the several stages of said counter whereby an output signal from said cascaded arrangement indicates that one stage of said counter has been set to the binary one state and all lower stages have been set to the binary zero state.

15. An apparatus of the character described in claim 13 wherein said means combining said second plurality of signals comprises a first and second plurality of logical AND circuits, said first plurality of logical AND circuits combining the zero transition signals of successive stages of said counter, said second plurality of logical AND circuits combining the one transition signal of each stage of said counter with the zero transition signal of all lower stages of said counter, an output signal from one of said second plurality of AND circuits indicating one stage of said counter has been set to the binary one state and all lower orders of said counter have been set to the binary zero state.

16. A counter failure detector comprising in combination a binary counter, a plurality of carry gate circuits interconnecting adjacent stages in said counter, means for applying count pulses to said counter, a plurality of output conductors associated with the several stages of said counter for designating the binary one and zero states thereof, means responsive to a first plurality of signals applied to said output conductors of said counter in response to each count pulse for generating a second plurality of signals indicative of the transition of said several stages of said counter, means responsive to said second plurality of signals for generating a signal indicating said count pulse has been counted, said means comprising a cascaded arrangement of logical AND and OR circuits so disposed as to provide an output only upon transition of one stage to the binary one state and all lower order stages to the binary zero state, means for generating error signals indicative of catastrophic flip-flop failuers and carry gate failures in the "on" state, said means comprising a plurality of gate circuits conditioned by the zero output of the associated flip-flops and conditioned by the output of the associated carry gate circuits, an error indicating apparatus and means responsive to said signal indicating said count pulse has been counted for inhibiting said error indicating device in the absence of said error signals.

17. A counter failure detector comprising in combination a binary counter, a plurality of carry gate circuits interconnecting adjacent stages in said counter, means for applying input pulses to said counter, a plurality of output conductors associated with the several stages in said counter for designating a binary one or binary zero count therein, means responsive to a first plurality of signals generated by said counter in response to each input pulse for generating a second plurality of signals, said last named means including a first plurality of logical AND circuits selectively associated with said output conductors for generating negative transition indicating signals for all of said several stages except the highest order stage, pulse generating means responsive to the outputs from said first plurality of logical AND circuits for generating signals indicating a negative transition of successive stages of said counter, means associated with the remaining output conductors for generating signals indicating the positive transition of the individual stages of said counter, a second plurality of logical AND circuits for selectively combining the positive transition indicating signals with the negative transition indicating signals from said pulse generating means whereby positive transition signals of each stage are combined with the negative transition signals of all lower stages, an output signal from one of said second plurality of logical AND circuits indicating said input pulse has been counted.

References Cited in the file of this patent

UNITED STATES PATENTS

| | | |
|---|---|---|
| 2,685,683 | Holden et al. | Aug. 3, 1954 |
| 2,716,230 | Oliwa | Aug. 23, 1955 |
| 2,719,959 | Hobbs | Oct. 4, 1955 |
| 2,734,684 | Ross et al. | Feb. 14, 1956 |
| 2,854,653 | Lubkin | Sept. 30, 1958 |
| 2,884,625 | Kippenhan | Apr. 28, 1959 |
| 2,894,684 | Nettleton | July 4, 1959 |

FOREIGN PATENTS

| | | |
|---|---|---|
| 769,617 | Great Britain | Mar. 13, 1957 |

OTHER REFERENCES

Richards: Arithmetic Operations In Digital Computers, D. Van Nostrand Co. Inc., Princeton, N. J., copyright 1955, pages 228 to 230.